(12) United States Patent
Dunn et al.

(10) Patent No.: US 7,494,285 B2
(45) Date of Patent: Feb. 24, 2009

(54) OPTICAL FIBRE CONNECTOR

(75) Inventors: Mark Jeffrey Dunn, Suffolk (GB);
Martyn Robert Owen, Norfolk (GB);
David Healy, Suffolk (GB)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/639,578

(22) Filed: Dec. 15, 2006
(Under 37 CFR 1.47)

(65) Prior Publication Data
US 2008/0013892 A1 Jan. 17, 2008

Related U.S. Application Data

(63) Continuation of application No. 11/406,725, filed on Apr. 19, 2006, now abandoned.

(30) Foreign Application Priority Data
Apr. 19, 2005 (GB) .................................. 0507866.2

(51) Int. Cl.
*G02B 6/38* (2006.01)
(52) U.S. Cl. .............................. 385/62; 385/66; 385/67; 385/68; 385/81; 385/84
(58) Field of Classification Search .................... 385/62, 385/66–68, 81, 84
See application file for complete search history.

(56) References Cited
U.S. PATENT DOCUMENTS 5,179,608 A   1/1993  Ziebol et al. ................... 385/81
5,282,259 A * 1/1994  Grois et al. ..................... 385/84
5,452,386 A   9/1995  Van Woesik .................... 385/72

(Continued)

FOREIGN PATENT DOCUMENTS

EP    1193516    4/2002

(Continued)

*Primary Examiner*—Frank G Font
*Assistant Examiner*—Ryan Lepisto

(57) ABSTRACT

The present invention relates to an optical fibre connector, and in particular to an optical port having a connector receptacle for receiving an optical fibre plug, and to an optical fibre connector assembly for transmitting and/or receiving an optical signal formed by an optical fibre connector and an optical fibre plug when these are joined together. The optical fibre connector assembly comprises an optical fibre connector and an optical fibre plug. The optical fibre plug includes a projecting ferrule and along an axis of this ferrule a first optical fibre. The optical connector including a hollow sleeve and within the sleeve a recessed ferrule and along an axis of this ferrule a second optical fibre. The sleeve has an open end for receiving and holding the projecting ferrule and has at the recessed ferrule a closed end, the arrangement being such that when the projecting ferrule is held within the sleeve both optical fibres are aligned to transmit and/or receive an optical signal along an optical axis defined by the fibres, and the closed end of the sleeve grips the recessed ferrule and the projecting ferrule more securely than the open end of the sleeve grips the projecting ferrule. The result is that if a force is applied at the open end of the ferrule to the projecting ferrule in a direction transverse to the optical axis then the first ferrule pivots within the sleeve about a point that lies closer to the closed end of the sleeve than to the open end of the sleeve.

10 Claims, 5 Drawing Sheets

U.S. PATENT DOCUMENTS

| | | | | |
|---|---|---|---|---|
| 6,283,644 | B1* | 9/2001 | Gilliland et al. | 385/93 |
| 6,616,462 | B2* | 9/2003 | Saitoh | 439/72 |
| 7,153,036 | B2* | 12/2006 | Healy et al. | 385/78 |
| 7,210,857 | B2* | 5/2007 | Blasingame et al. | 385/88 |
| 2002/0031310 | A1* | 3/2002 | Kobayashi et al. | 385/70 |
| 2003/0068136 | A1* | 4/2003 | Kobayashi et al. | 385/70 |
| 2004/0037509 | A1* | 2/2004 | Wisecarver | 385/55 |

FOREIGN PATENT DOCUMENTS

| | | |
|---|---|---|
| JP | 63-206712 | 8/1988 |
| JP | 2001-42160 | 2/2001 |
| JP | 2004-45632 | 2/2004 |
| JP | 2004-287198 | 10/2004 |
| JP | 2004-317848 | 11/2004 |
| WO | WO 94/12901 | 6/1994 |

* cited by examiner

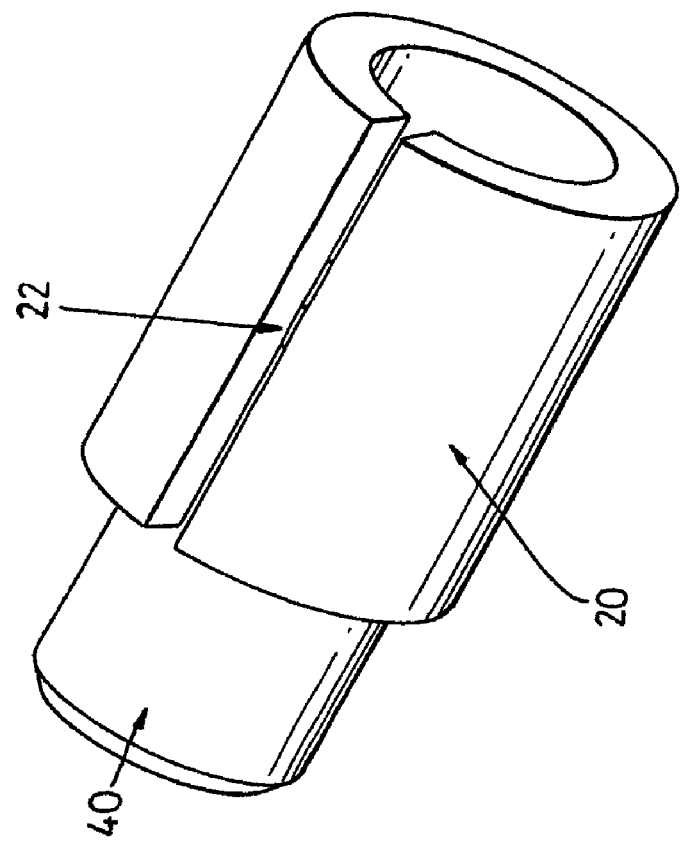
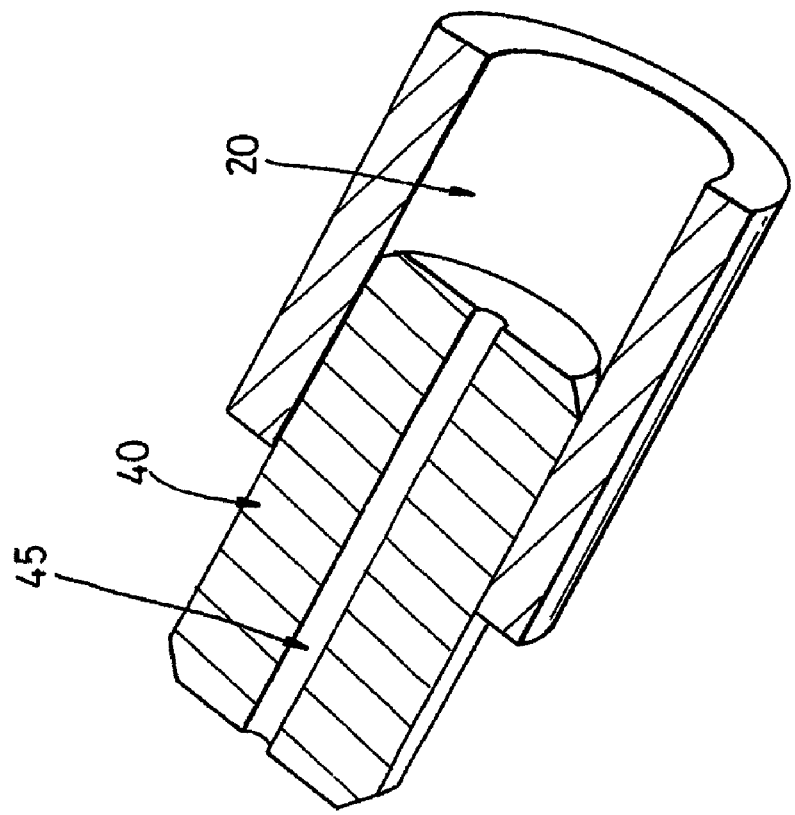
*Fig. 2a* (PRIOR ART)
*Fig. 2b* (PRIOR ART)

OPTICAL FIBRE CONNECTOR

This application is a continuation application of U.S. patent application Ser. No. 11/406,725, filed on Apr. 19, 2006 now abandoned.

1. Field of the Invention

The present invention relates to an optical fibre connector, and in particular to an optical fibre connector for receiving an optical fibre plug, and to an optical fibre connector assembly formed by an optical fibre connector and an optical fibre plug when these are joined together.

2. Description of the Related Art

Optical connectors are used in optical fibre communications systems to make connections between optical fibre cables, between such cables and optoelectronic components and also between such components. For example, an optical fibre cable may be connected by means of an optical fibre plug with an optoelectronic component such as an optical fibre transmitter unit or an optical fibre receiver unit having a complementary optical fibre connector. Optical fibre receiver and transmitter units are referred to herein simply as "transceiver" units, both individually and in combination as a unit that both receives and transmits optical signals.

Optical fibre communications systems may use either single-mode optical fibre or multimode optical fibre. The optical connector brings the cores of such fibres together to enable light to propagated from one fibre to the other. Normally, the optical fibre plug will comprise a projecting cylindrical ferrule inside of which an optical fibre is axially mounted. The fibre terminates at the end of the ferrule and is brought into abutting contact with a similar ferrule/fibre assembly within the connector. The alignment between the fibre cores in the plug and connector is defined by a cylindrical sleeve in the connector into which the optical fibre plug ferrule is seated. With such an arrangement it is possible to ensure that that the fibre cores are repeatably aligned to within 1 μm whenever the plug is inserted into the connector.

Although this arrangement generally works well, in customer installations a problem has been noted if one end of the connection experiences a force, which tends to pull the connection transversely to the insertion direction of the plug. Typically what happens is that an optical fibre cable terminated by the inserted plug is pulled transversely. The ferrule is not held absolutely securely within the sleeve, and in fact the sleeve will normally have some compliance or at least some clearance so that the plug can be smoothly inserted and withdrawn from the sleeve. As a result, a transverse force on the plug will result in some movement within the sleeve, referred to as "wiggle". This causes the ends of the fibre to come at least partially out of alignment, with a consequent drop in optical coupling efficiency for optical signals transmitted through the connector.

One known way to deal with this problem is to make the length of the sleeve longer, as this will naturally improve the maintenance of optical alignment within the sleeve. However, there is a limit to how long such a sleeve may be made, owing to the need to maintain plug compatibility with existing standard optical fibre plugs, which must be able to seat fully within the sleeve. Also, as the sleeve length increases, this causes the retention force of the connector to increase and if the retention force is too great then this causes further problems. It is also not possible to extend the length of the sleeve inwards within the optical connector, as a point is reached when the sleeve impinges on other optical components typically used with such connectors, such as collimating lenses or other optical elements.

Therefore, there is a need for a new and improved system for maintaining the optical fibre alignment within the connector assembly when one end of the connected experiences a transverse force.

SUMMARY OF THE INVENTION

According to a first aspect of the invention, there is provided an optical fibre connector for transmitting and/or receiving an optical signal, the connector comprising: a hollow sleeve having an inner surface that extends around an optical axis along which an optical signal may be transmitted to and/or received from an optical fibre plug, the hollow sleeve comprising: an open end for receiving and aligning therein an optical fibre plug and a closed end in which a face of a first ferrule is received, the first ferrule supporting a first optical fibre along the optical axis, the first optical fibre being terminated at the face of the first ferrule; characterised in that the closed end of the sleeve has a greater resistance to movement transverse to the optical axis than the open end of the sleeve.

The inner surface of the sleeve may most commonly be a generally cylindrical surface so that the inner surface of the sleeve extends generally cylindrically around the optical axis. Similarly, the ferrules will most generally be cylindrical ferrules.

The sleeve may be strengthened so that radially outwards movement at the interface between the ferrules of the optical fibre plug and the optical caused by any external transverse forces on either the plug or connector is more constrained at the interface than at the open end of the sleeve. In general, this means that although the optical fibre plug ferrule may twist within the sleeve, that relative radial movement of the optical fibre at the interface is decreased at the expense of allowing greater radial movement of the optical fibre and the optical fibre plug ferrule in the vicinity of the open end of the sleeve. As a result, it has been found that the optical alignment at the interface between the optical fibres is better maintained, even though the optical axis at this point will have a bend owing to the relative rotational movement of the two ferrules.

For some embodiments of the invention this more secure grip in the region of the interface between the two aligned ferrules is provided by the relative strengthening of the open end of the sleeve as compared with the closed end of the sleeve.

Because the pivot point lies closer to the closed end than the open end of the sleeve, there is relatively less radial movement between the optical fibres at the interface between the two ferrules than the radial movement of the plug ferrule in the vicinity of the open end of the sleeve.

One way in which the improved relative strengthening and grip of the sleeve can be enhanced in the region of the closed end of the sleeve is if the cross-sectional area of the sleeve surrounding the connector ferrule is greater than the cross-sectional area of the sleeve towards the open end of the sleeve.

Another way in which this can be achieved is by forming the sleeve from a material the composition or micro-structure of which varies between the closed end of the sleeve and the open end of the sleeve. For example, the sleeve may be made from a glass or other fibre reinforced polymer having a greater fill of fibre in the region of the closed end of the sleeve.

In one embodiment of the invention, the sleeve has one or more reinforcing circumferential bands in the vicinity of the closed end of the sleeve.

Rather than actively reinforcing the region of the sleeve nearest the connector ferrule, it may be possible to achieve a similar effect by relatively weakening the sleeve in the region towards the open end of the sleeve. One example of this would be to provide grooves in the wall of the sleeve that do not cut fully though the sleeve to form a slot, but which nevertheless provide greater radial compliance at the open of the sleeve. Therefore, relative weakening near or towards the open end of the sleeve is another way of achieving the relative strengthening of the sleeve in the vicinity of the interface between the aligned ferrules.

In a further embodiment of the invention, the relative weakening of the sleeve is provided by one or more slots that extend in one direction towards the open end of the sleeve and that in the opposite direction stop short of the closed end of the sleeve. These slots extend in a radial direction fully through the sleeve and therefore provide a degree of radial flexibility at the open end of the sleeve, which is not present at the closed end of the sleeve. The slots may be parallel with the length of the sleeve, or may be helical slots or have any other suitable orientation.

The change in mechanical characteristics between the open and closed ends of the sleeve may be provided by a sleeve that has at least one slot which widens towards the open end of the sleeve.

The optical connector may have a sleeve which has a single slot that extends the full length of the sleeve, however, this is not always necessary as it is possible to dimension the ferrules so that these can be inserted and seated securely within a slotless sleeve.

In yet another embodiment of the invention, the sleeve has an outer diameter that tapers radially inwards towards the open end of the sleeve. With such an embodiment it may not be necessary to provide any slot in the sleeve to achieve the difference in mechanical characteristics between the open and closed ends of the sleeve, although such a slot may still be desirable to provide a minimum degree of radial flexibility to aid insertion of the plug ferrule within the sleeve.

According to a second aspect of the invention, there is provided an optical fibre connector assembly for transmitting and/or receiving an optical signal, comprising an optical fibre connector according to any preceding claim and an optical fibre plug, the optical fibre plug comprising a second ferrule supporting a second optical fibre along an axis of said ferrule; the assembly being such that when the second ferrule is received within the hollow sleeve the first and second optical fibres are aligned to transmit and/or receive an optical signal along the optical axis, and characterised in that the closed end of the sleeve grips the first ferrule and the second ferrule such that that if a force transverse to the optical axis is applied to the second ferrule at the open end of the sleeve then the second ferrule pivots within the sleeve about a point that lies closer to the closed end of the sleeve than to the open end of the sleeve.

BRIEF DESCRIPTION OF THE DRAWINGS

FIGS. 2a-2b show schematic depictions of a sleeve and a ferrule from a known optical connector assembly;

DETAILED DESCRIPTION OF THE INVENTION

Figure 1:
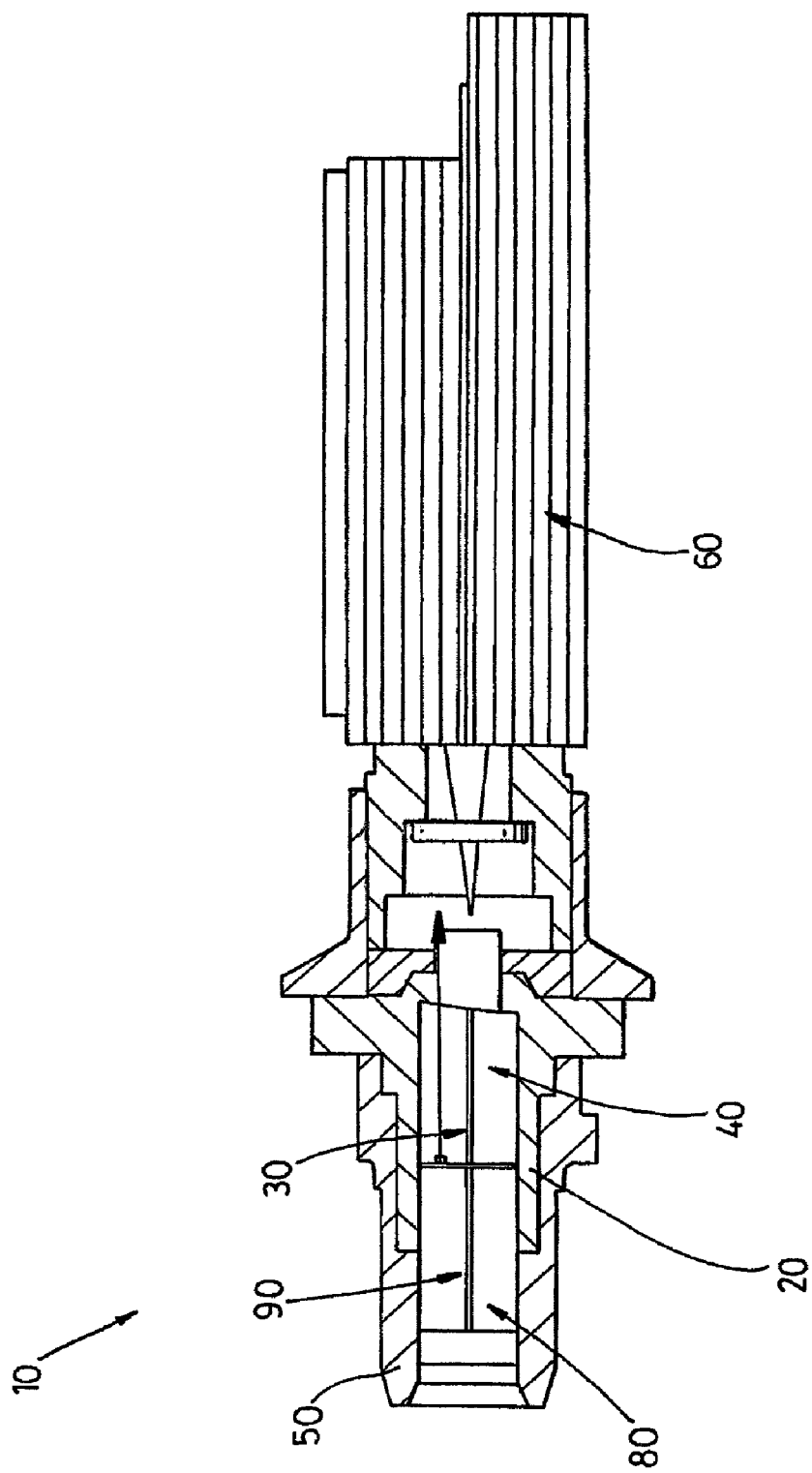
FIG. 1 shows a schematic depiction of an optical component in optical connection with a known optical connector assembly.

FIG. 1 shows a schematic depiction of an optical component 60 in optical connection with a known optical connector assembly 10. The optical connector assembly comprises an optical connector that comprises a first ferrule 40 received within a sleeve 20. A first optical fibre 30 is received within the first ferrule 40 along an optical axis 45 (shown in FIG. 2a, FIG. 4b and FIG. 5b). The sleeve, first ferrule and first optical fibre are concentric with the optical axis 45. The first ferrule is received within a closed end of the sleeve such that a first end of the first ferrule is received within a central region of the sleeve. The first optical fibre is terminated at the first end of the first ferrule. The connector further comprises a nose 50 that surrounds the sleeve 20 and to which an optical plug can be attached.

In use, an optical plug is connected to the optical connector to form an optical connector assembly. The optical plug comprises, amongst other components, a second ferrule 80 and a second optical fibre 90 which is received within the second ferrule. The plug comprises further components (not shown) that enable the plug to mate to the nose 50 of the optical connector.

In use, the plug is mated with the connector such that the second ferrule is received within the open end of the sleeve and such that the first ferrule is aligned with the second ferrule. The optical plug is formed such that the nose, the second ferrule and the second optical fibre are concentric. Thus, when the second ferrule is received within the open end of the sleeve the first optical fibre is aligned with the first optical fibre, allowing light propagating in the first optical fibre to pass into the second optical fibre and vice versa. FIGS. 2a and 2b show schematic depictions of a part of the arrangement described above with reference to FIG. 1 and shows the first ferrule 40 received within the closed end of the sleeve 20. As is common, the sleeve 20 comprises a slot 22 that extends along the length of the sleeve.

As has been discussed above, a problem has been observed that when a force transverse to the optical axis is applied to the optical plug, there is a relative motion between the first and the second ferrules that cause optical losses that can lead to the loss of transmitted data.

FIGS. 3 to 5 show schematic depictions of sleeves that are adapted to reduce the impact of transverse forces applied to the optical plug. In general, this is achieved through the design of the sleeve such that the region near the closed end is more resistant to a bending motion that the region near to the open end.

Figure 3B:
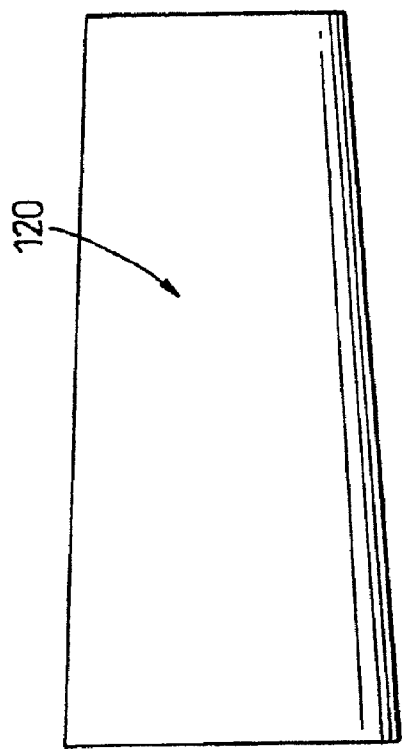
FIGS. 3a-3c show schematic depictions of a sleeve for use in an optical connector according to a first embodiment of the present invention.
Figure 3C:
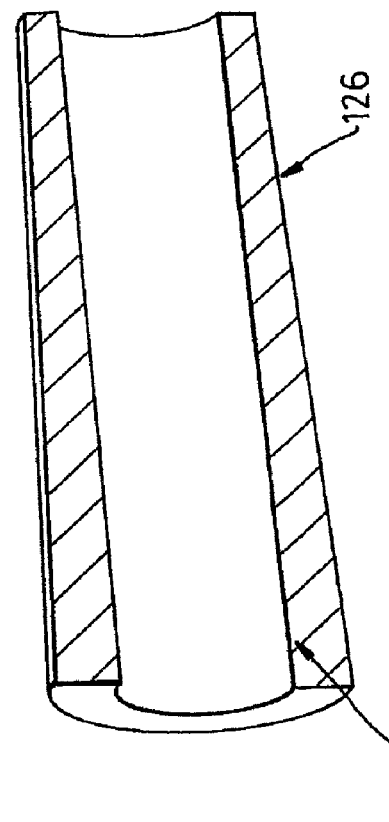
Figure 3A:
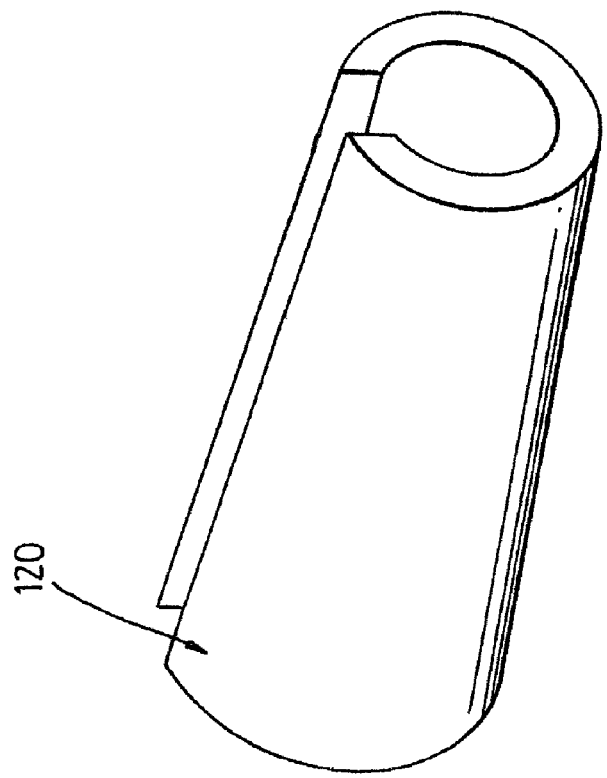

FIG. 3 shows a schematic depiction of a sleeve 120 for use in an optical connector according to a first embodiment of the present invention; FIG. 3a shows a perspective view of the sleeve 120, FIG. 3b shows a side view of the sleeve 120 and FIG. 3c shows a cross-sectional view of the sleeve from the side. Sleeve 120 has an internal bore of a uniform diameter in order to receive the first and second ferrules but the outer surface of the sleeve is tapered such that the outer diameter at the closed end is greater than that at the open end of the sleeve. FIG. 3c shows that the wall thickness of the sleeve is greater at the closed end 124 than at the open end 126. The thicker wall means that the sleeve has a greater stiffness at the closed end than at the open end and thus if a transverse force is applied to a ferrule received in the open end of the sleeve, the sleeve will bend nearer to the open end than the closed end.

Figure 4A:
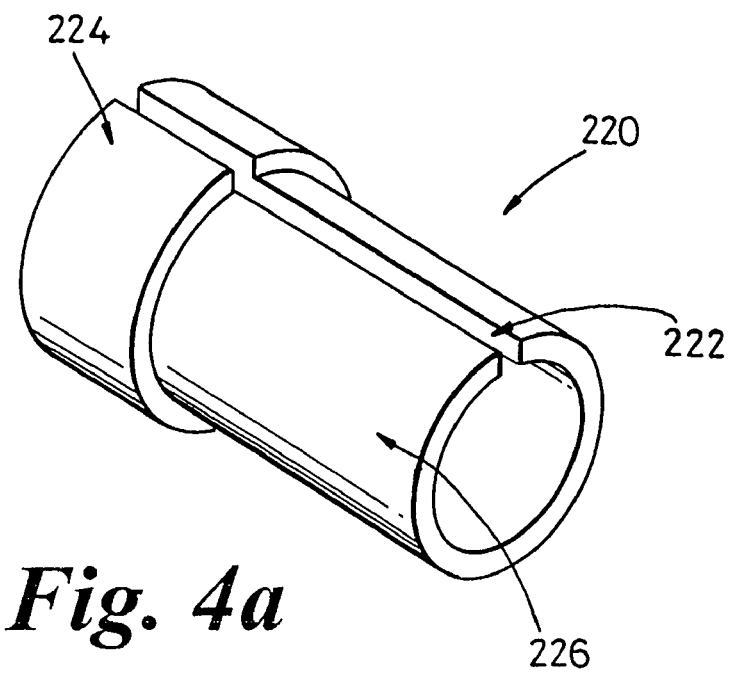
FIGS. 4a-4b show schematic depictions of a sleeve and ferrule for use in an optical connector according to a second embodiment of the present invention.
Figure 4B:
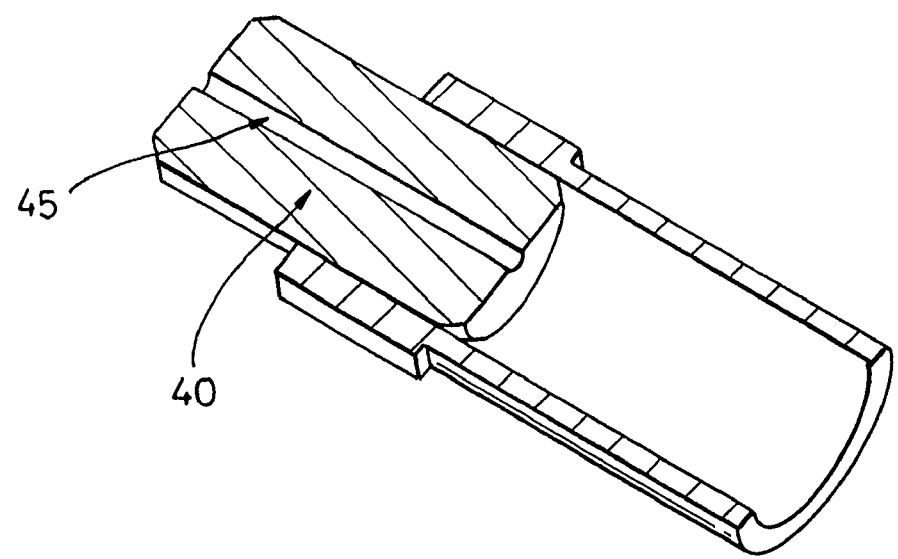

FIG. 4 shows a schematic depiction of a sleeve 220 for use in an optical connector according to a second embodiment of the present invention; FIG. 4a shows a perspective view of the sleeve 220 and FIG. 4b shows a cross-sectional view of the sleeve. The sleeve 220 comprises a slot 222 extending along its entire length and further comprises two regions having different thicknesses; closed end 224 has a greater sleeve thickness (and thus a greater outer diameter) than open end 226. This structure has a greater stiffness at the closed end than at the open end and thus if a transverse force is applied to a ferrule received in the open end of the sleeve, the sleeve will bend nearer to the open end than the closed end.

Figure 5A:
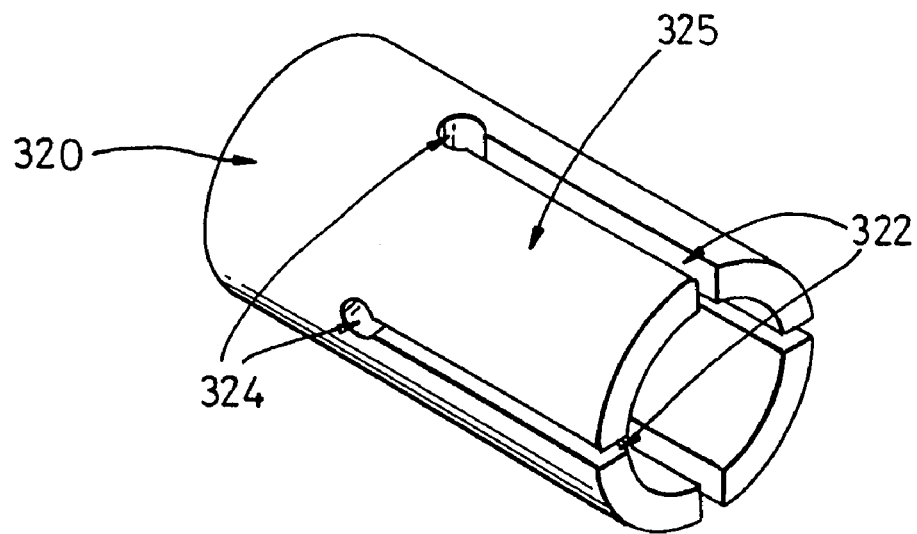
FIGS. 5a-5b show schematic depictions of a sleeve and ferrule for use in an optical connector according to a third embodiment of the present invention.
Figure 5B:
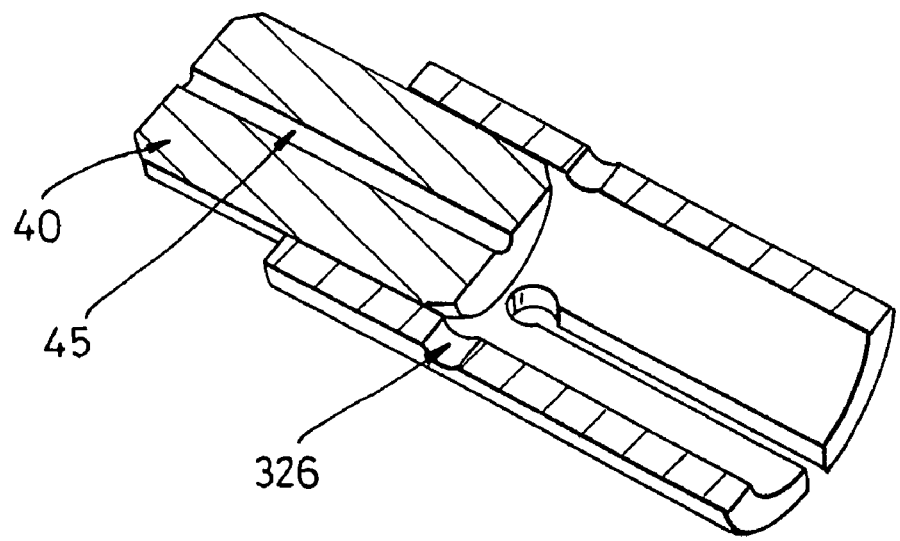

FIG. 5 shows a schematic depiction of a sleeve 320 for use in an optical connector according to a third embodiment of the present invention; FIG. 5a shows a perspective view of the sleeve 220 and FIG. 5b shows a cross-sectional view of the sleeve. The sleeve 520 comprises two different mechanisms that act to provide the advantage according to the present invention. In contrast to the sleeves described above, sleeve 320 comprises a plurality of fractional slots 322 that extend partially along the length of the sleeve, extending from the open end of the sleeve towards the closed end of the sleeve. Each of these fractional slots comprise a cavity 324 formed at the closed end of the slot. The fractional slots define a plurality of flaps 325 which will tend to act as hinges when a transverse force is applied to ferrule received within the open end of the sleeve. By forming the cavities 324 the amount of material that forms the hinge to each flap is removed and this facilitates the bending of the flaps under the influence of a transverse force. The length of the fractional slots and the size of the cavity can be determined such that the sleeve will bend nearer to the open end than the closed end when a transverse force is applied. Although FIG. 5 shows a sleeve comprising four fractional slots it will be understood that the sleeve may comprise fewer or greater slots than this.

Sleeve 320 further comprises a partial circumferential groove 326, which is formed in the interior of the sleeve. The removal of the material to form the partial groove reduces the stiffness of the sleeve at this point and thus under a transverse force the sleeve is likely to bend near to the partial circumferential groove and thus the groove can be positioned to ensure that the sleeve will bend nearer to the open end than the closed end when a transverse force is applied.

Different aspects of the invention have for convenience been illustrated and described in terms of different embodiments. It should be noted however, that features of each of the different embodiments described above are not mutually exclusive of each other, and may be combined to achieve the required relative strengthening of the sleeve in the vicinity of its close end.

For example, although FIG. 5 shows a sleeve comprising both a partial circumferential groove and a plurality of fractional slots it will be readily understood that one or more fractional slots (with or without a cavity at the closed end of each slot) may be used in a sleeve without a partial circumferential groove and vice versa.

Furthermore, the elements of sleeve design described above with reference to FIGS. 3-5 may be combined with other elements: the tapered sleeve of FIG. 3 may further comprise a partial circumferential groove and/or one or more fractional slots (with or without a cavity); the stepped sleeve of FIG. 4 may further comprise a partial circumferential groove and/or one or more fractional slots (with or without a cavity); the stepped sleeve of FIG. 4 may comprise a further number of stepped regions; the tapered sleeve of FIG. 3 may be combined the stepped sleeve of FIG. 4 to provide a sleeve having discrete tapered regions; etc.

Additional material may be added to the sleeve to strengthen the closed end of the sleeve; for example, one or more circumferential bands of material may be formed around the closed end of the sleeve; alternatively, or in addition, one or more ribs running axially along a part of the sleeve at or near to the closed end of the sleeve may be added. Such projections from the sleeve increase the stiffness of the sleeve near the closed end of the sleeve and thus the sleeve is more likely to bend in the region of the open end of the sleeve when a transverse force is applied. The sleeve may be formed so as to comprises these radial and/or circumferential projections, or the projections may be added to the sleeve in a later stage of production. This enables the use of stiffer materials that might otherwise not be suitable for use in forming a sleeve.

It is also possible to use materials having different physical properties, or to process the materials to change their properties, such that the closed end of the sleeve has a greater resistance to bending than the open end of the sleeve. For example, the sleeve may be made from a glass or other fibre reinforced polymer having a greater fill of fibre in the region of the closed end of the sleeve.

It is also possible to make a composite sleeve in which the closed end of the sleeve is made from a stronger and stiffer material than the material that is used to form the open end of the sleeve. It will be understood that this will require very precise fabrication techniques as the primary function of the sleeve is to ensure that the first and second ferrules are aligned accurately in order to minimise any optical losses between the first and second optical fibres.

The person skilled in the art will therefore appreciate that there are many further combinations within the scope of the following claims. Persons skilled in the art of systems and methods for optical fibre connectors will also recognise from the previous detailed description and from the drawings and claims, that other modifications and changes can be made to the preferred embodiments of the invention without departing from the scope of this invention defined in the following claims.

The invention claimed is:

1. An optical fibre connector for transmitting and/or receiving an optical signal, the connector comprising:
    a hollow sleeve having an inner surface that extends around an optical axis along which an optical signal may be transmitted to and/or received from an optical fibre plug, the hollow sleeve comprising:
    an open end for receiving and aligning therein the optical fibre plug, and
    a closed end in which a face of a first ferrule is received, the first ferrule supporting a first optical fibre along the optical axis, the first optical fibre being terminated at the face of the first ferrule;
    wherein the thickness of the sleeve decreases between the closed end of the sleeve and the open end of the sleeve in such a manner that the closed end of the sleeve has a greater resistance to movement transverse to the optical axis than the open end of the sleeve.

2. The optical fibre connector of claim 1, wherein the closed end of the sleeve is strengthened relative to the open end.

3. The optical fibre connector of claim 1, wherein the cross-sectional area of the sleeve surrounding the first ferrule is greater than the cross-sectional area of the sleeve towards the open end of the sleeve.

4. The optical fibre connector of claim 1, wherein the composition of the material forming the sleeve varies between the closed end of the sleeve and the open end of the sleeve.

5. The optical fibre connector of claim 1, wherein the sleeve comprises one or more slots that extend in one direction towards the open end of the sleeve and that in the opposite direction stop short of the closed end of the sleeve.

6. An optical fibre connector according to claim 5, wherein the one or more slots extend parallel with the length of the sleeve.

7. The optical fibre connector of claim 1, wherein the sleeve comprises an outer diameter that gradually tapers radially inwards towards the open end of the sleeve.

8. The optical fibre connector of claim 1, wherein the sleeve comprises one slot that extends the full length of the sleeve.

9. The optical fibre connector of claim 1, in which the sleeve comprises one or more slots, which widen towards the closed end of the sleeve.

10. An optical fibre connector assembly for transmitting and/or receiving an optical signal, comprising the optical fibre connector of claim 1 and an optical fibre plug, the optical fibre plug comprising a second ferrule supporting a second optical fibre along an axis of said ferrule;

the assembly being such that when the second ferrule is received within the hollow sleeve the first and second optical fibres are aligned to transmit and/or receive an optical signal along the optical axis, and characterised in that the closed end of the sleeve grips the first ferrule and the second ferrule such that that if a force transverse to the optical axis is applied to the second ferrule at the open end of the sleeve then the second ferrule pivots within the sleeve about a point that lies closer to the closed end of the sleeve than to the open end of the sleeve.

* * * * *

UNITED STATES PATENT AND TRADEMARK OFFICE
CERTIFICATE OF CORRECTION

| | |
|---|---|
| PATENT NO. | : 7,494,285 B2 |
| APPLICATION NO. | : 11/639578 |
| DATED | : February 24, 2009 |
| INVENTOR(S) | : Mark Jeffrey Dunn, David Healy and Martyn Robert Owen |

It is certified that error appears in the above-identified patent and that said Letters Patent is hereby corrected as shown below:

Column 8, Line 9, Claim 10, delete "that that" and insert --that--.

Signed and Sealed this
Twenty-eighth Day of December, 2010

David J. Kappos
*Director of the United States Patent and Trademark Office*